UNITED STATES PATENT OFFICE.

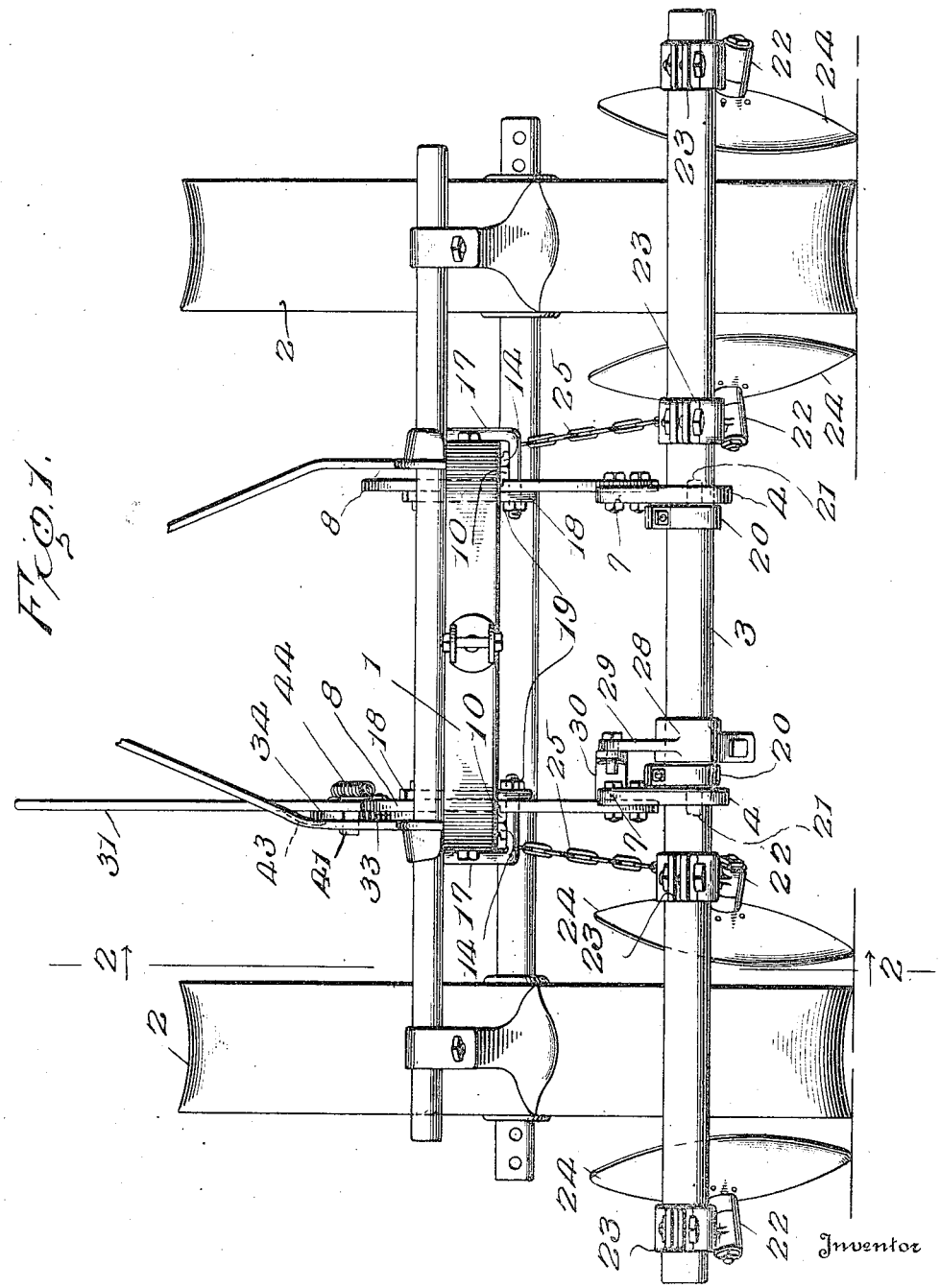

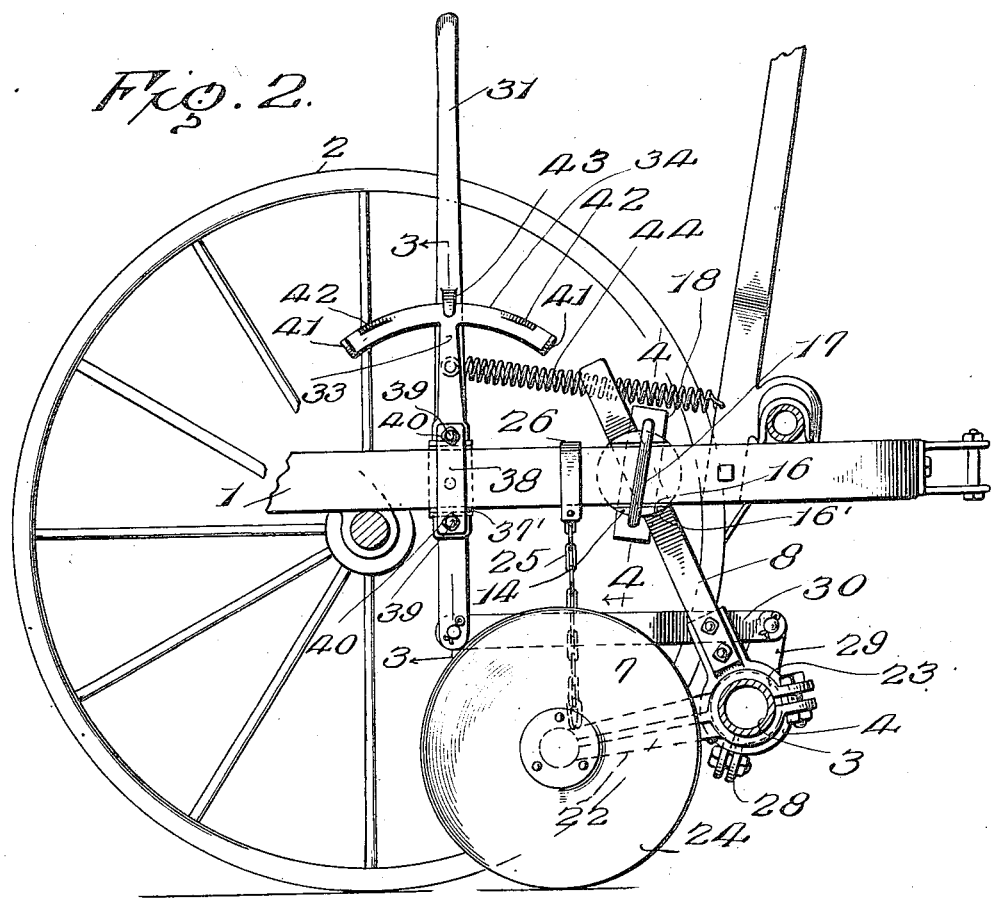

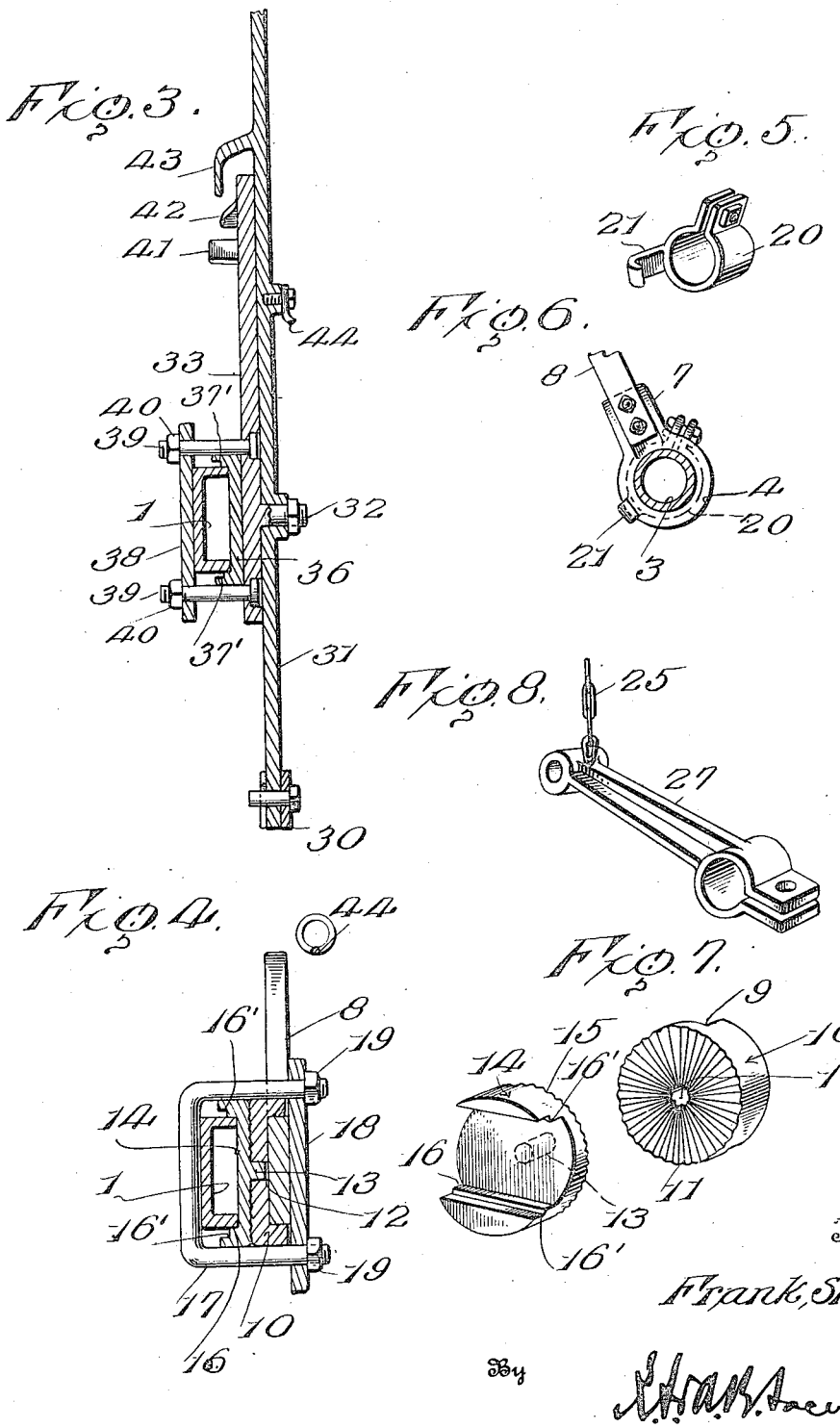

FRANK SHERWIN, OF BROOKINGS, SOUTH DAKOTA.

PLANTER ATTACHMENT.

1,260,076. Specification of Letters Patent. Patented Mar. 19, 1918.

Application filed September 27, 1917. Serial No. 193,597.

*To all whom it may concern:*

Be it known that I, FRANK SHERWIN, a citizen of the United States, residing at Brookings, in the county of Brookings and State of South Dakota, have invented certain new and useful Improvements in Planter Attachments, of which the following is a specification.

This invention relates to improvements in blind plowing attachments for corn planters of the type disclosed in Letters Patent No. 1,220,014, granted to me March 20, 1917, and No. 1,235,606, granted to me August 7, 1917, the object of the present invention being to improve the construction and arrangement of the several parts whereby to increase the efficiency and adaptability of the attachment.

The invention is illustrated in the accompanying drawings, in which—

Figure 1 is a rear elevation of the attachment showing the position of the same upon a planter frame;

Fig. 2 is a vertical longitudinal section on the line 2—2 of Fig. 1;

Fig. 3 is a detail section on the line 3—3 of Fig. 2;

Fig. 4 is a detail section on the line 4—4 of Fig. 2;

Fig. 5 is a detail of the device for preventing endwise movement of the rock shaft;

Fig. 6 is a detail section of the rock shaft showing a portion of the support for the same in side elevation;

Fig. 7 is a detail perspective view of a rosette employed in securing the attachment to the planter frame;

Fig. 8 is a detail perspective view of a check device for limiting the movement of the rock shaft in a direction to lower the cultivator disks;

Fig. 9 is a detail perspective view of the parts for supporting the hand lever and holding the same in a set position.

The planter frame 1 may be of any well-known form and is supported by ground wheels 2 in the usual manner, these parts forming no part of my present invention and being illustrated conventionally and only to such an extent as is deemed necessary to permit an understanding of the invention.

In rear of the ground wheels 2, a rock shaft 3 is disposed transversely of the planter and this rock shaft is rotatably mounted in bearing collars or rings 4. It will be understood that these collars are fitted to the rock shaft in such a manner that they will firmly support the said shaft but will permit it to rotate freely. The collars or bearings are provided with grooved ears or extensions 7, in which the lower ends of hangers 8 are rigidly secured, the upper ends of said hangers passing through grooves 9 provided in the members 10 of double rosettes which are employed to secure the hangers to the planter frame. It is to be understood that these hangers are duplicated, one being provided at each side of the planter frame and the description of one hanger and its connections applies to both. The rosette member 10 is provided with a corrugated or serrated face 11 and through the center of said member is an opening 12 in which is pivotally engaged a stud 13 projecting centrally from the mating member 14 and the corrugated face of the said member 10 engages the corrugated face 15 of the member 14. The face of the member 14 opposite the corrugated face 15 is constructed with a diametrical groove 16 which fits against the planter frame 1, and the rosette members are relatively adjustable so that the hanger may be secured at any desired angle relative to the planter frame. The walls of the groove 16 are provided with longitudinal shoulders 16' which permit the device to be applied to planter frames of different widths. A clip 17 is passed around the planter frame and above and below the rosette and has its ends inserted through a clip plate 18 which bears against the hanger, nuts 19 being mounted upon the ends of said bolt and adapted to be turned home against the clip plate so as to firmly secure the parts in desired position. It will be readily understood that the groove in the member 14, by engaging the planter frame, effectively prevents the rotation of said member upon the frame and the groove of the member 10, by engaging the hanger, effectively prevents rotation of the hanger relative to the rosette so that after the parts have been secured in the adjusted position they will be held firmly and will remain in said position notwithstanding the shocks and jolts to which the planter may be subjected while in use. The described construction also permits the device to be adjusted longitudinally of the planter frame and also permits the hanger to be adjusted to any desired height so that the attachment may be readily applied to a planter frame of any construction and will support the rock shaft in the desired position relative to the planter wheels.

To prevent endwise movement of the rock shaft 3, I firmly clamp thereto adjacent the bearings 4 the collars or rings 20 which are provided with lateral hook-shaped extensions 21 which will pass in front of the bearings and will engage around the same so that while the said hooks may ride upon the bearings as the shaft is rocked, their engagement with said bearings will positively prevent endwise movement of the shaft.

At proper points upon the rock shaft, I clamp the disk carrying arms 22 which extend forwardly from the rock shaft and are provided with split bearings at their rear ends whereby they may be clamped positively around the rock shaft. The split bearings or collars 23 at the rear ends of these arms will permit them to be adjusted along or around the rock shaft and be securely clamped thereto so that they will remain in a set position. The longitudinal adjustment of the said arms will bring the disks 24 into the proper position relative to the ground wheels 2 so that the said disk will travel beside and partially in rear of the ground wheels at opposite sides of the planter wheel track and will throw loose soil over upon the seed which have just been planted thereby covering all uncovered seed and will cut out, cover up, and destroy weeds which would otherwise spring up along the planted corn row.

It will be readily understood that the draft upon the cultivator disks tends to cause them to swing rearwardly under the rock shaft and to correct and check this tendency, I provide check chains or other flexible devices 25 which are secured at their lower ends to the disk-carrying arms and are secured at their upper ends to clips or clevises 26 which are firmly secured to the planter frame. By properly adjusting the clips and the chains, the maximum depth to which the disks may enter the ground may be very readily determined. It sometimes happens that the form of a planter frame is such that the side bars thereof will not lie over or approximately over the disk-carrying arms. In such event, I employ a supplemental check arm 27 which is identical in construction with the disk-carrying arms and is secured to the rock shaft in the same manner. This check arm will have the lower end of the chain 25 attached thereto and it may be secured at any point along the rock shaft, which will bring it within or approximately within the vertical plane of the side bar of the planter frame.

At any convenient point along the rock shaft, I rigidly secure thereto a collar 28 having a crank arm 29 rising therefrom and to the extremity of said crank arm I pivot a link 30 which extends forwardly and has its front end pivoted to the lower end of a hand lever 31. This hand lever 31 is mounted upon a fulcrum pin or stud 32 projecting laterally from the post 33 which carries a quadrant 34 at its upper end. The post 33 is rectangular in cross section as shown most clearly in Fig. 9 and fits within the groove 35 of a bracket 36 which is disposed between the post and the side bar of the planter frame and is constructed with a groove 37 running at a right angle to the groove 35 and having longitudinal shoulders 37' in its side walls so that the bracket will fit over any planter frame and be held against rotation thereon. A clip plate 38 is fitted against the side of the planter frame so that the side bar of the frame will be between the clip plate and the bracket 36, and bolts 39 are fitted in the post 33 and project through the ends of said clip plate so that when the nuts 40 are turned home against the clip plate the quadrant post 33 will be firmly supported on the planter frame. The quadrant 34 is provided with lateral stop lugs 41 at its ends which limit the movement of the hand lever in the opposite directions and upon the face of the quadrant I provide beveled projections or lugs 42 which terminate in spaced relation to the said stops 41 so as to provide recesses in which a finger 43 on the hand lever may be received. A spring 44 is secured to and extends between the hand lever and a rear bar of the planter frame, or other fixed point, and tends to draw the lever rearwardly but the tension of the spring is so regulated that it will not draw the lever to its extreme rear position and will permit it to oscillate freely as the planter is drawn over the ground and thereby permit the cultivator disks to ride over stones and similar obstructions which may be encountered. If, however, it be desired to lift the disks entirely clear of the ground, the lever may be manually swung forward and the tension of the spring will at once pull the finger 44 into the space or recess between the forward stop 41 and the adjacent lug 42 and by drawing the stop finger against the forward lug 42 will hold the lever in such forward position thereby retaining the disks out of the ground.

It will be readily understood, upon an inspection of the drawings, that the lifting and regulating devices are symmetrical so that they may be applied to either side bar of the planter frame and to either face of the side bar as the form or dimensions of the frame may necessitate.

From the foregoing description taken in connection with the accompanying drawings, it will be seen that I have provided an exceedingly simple apparatus which may be readily attached to any planter and by the use of which the ground may be cultivated simultaneously with the planting of the seed and obnoxious growths eliminated.

Having thus described the invention, what is claimed as new is:

1. An attachment for planters comprising a rock shaft, ground-treating implements carried by said shaft, means for suspending said shaft from a planter frame, a crank arm on said shaft, a lever mounted upon the planter frame for free oscillation, a connection between said lever and said crank arm, and means connected with the lever for yieldably holding the ground-treating implements lowered.

2. An attachment for planters comprising a rock shaft, means for suspending the rock shaft from a planter frame, a post adapted to be secured upon a planter frame, a quadrant at the upper end of said post having lateral stops at said ends and provided on its face with beveled lugs disposed in spaced relation to said stops, a lever fulcrumed upon said post, a finger carried by said lever and arranged to ride over the quadrant to engage between either stop thereon and the adjacent cam lug, and connections between the lever and the rock shaft.

3. A planter attachment comprising a rock shaft, means for suspending the rock shaft from a planter frame, a lever, connections between the said lever and the rock shaft, a post adapted to be secured upon the planter frame and having the lever fulcrumed thereon, means carried by said post for holding the lever in a set position, and yieldable means attached to the lever for permitting free oscillation of the same and drawing the same normally in one direction.

4. An attachment for planters comprising a bracket constructed to engage either face of the side bar of a planter frame, a quadrant post fitted against said bracket, a quadrant carried by said post, a lever fulcrumed upon the post and coöperating with the quadrant, and means for securing the post to the bracket and the bracket to the planter frame.

In testimony whereof I affix my signature.

FRANK SHERWIN.

Copies of this patent may be obtained for five cents each, by addressing the "Commissioner of Patents, Washington, D. C."